(No Model.) 2 Sheets—Sheet 1.

S. R. PLUMB.
SCISSORS AND SHEARS.

No. 291,623. Patented Jan. 8, 1884.

Attest:
F. W. Howard
J. J. Chapman

Inventor:
Salmon R. Plumb
by W. H. Babcock
Attorney (No Model.) 2 Sheets—Sheet 2.

S. R. PLUMB.
SCISSORS AND SHEARS.

No. 291,623. Patented Jan. 8, 1884.

Attest:
F. W. Howard
F. T. Chapman.

Inventor;
Salmon R. Plumb
by W. H. Babcock
Attorney

UNITED STATES PATENT OFFICE.

SALMON R. PLUMB, OF CHESHIRE, CONNECTICUT, ASSIGNOR OF ONE-HALF TO GEORGE J. CAPEWELL, OF SAME PLACE.

SCISSORS AND SHEARS.

SPECIFICATION forming part of Letters Patent No. 291,623, dated January 8, 1884.

Application filed August 1, 1883. (No model.)

*To all whom it may concern:*

Be it known that I, SALMON R. PLUMB, a citizen of the United States, residing at Cheshire, in the county of New Haven and State of Connecticut, have invented certain new and useful Improvements in Shears and Similar Articles; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to shears and scissors which have the blades made separate from the handles; and it consists, chiefly, in the combination of a pair of handles which are pivoted together at their inner ends, with a pair of crossed blades which are pivoted together, the rear ends of the blades being pivoted, respectively, to the middle parts of the handles, and the handles being recessed, so that the blades will set flush therein.

Figure 1:
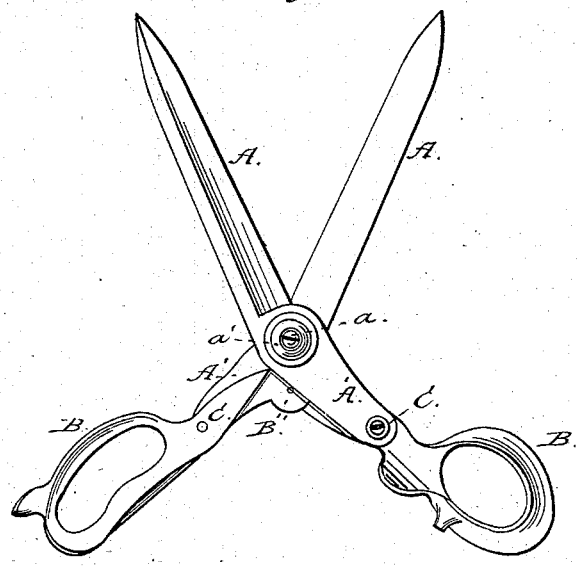
Figure 2:
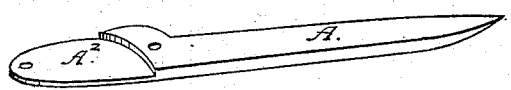
Figure 3:
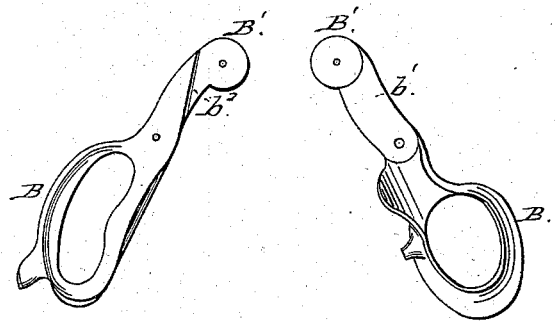
Figure 4:
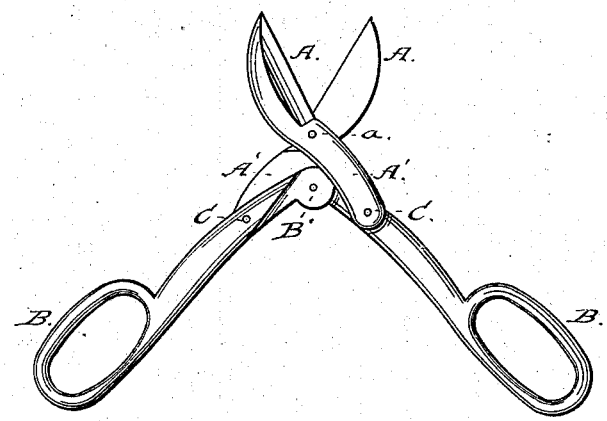
Figure 5:
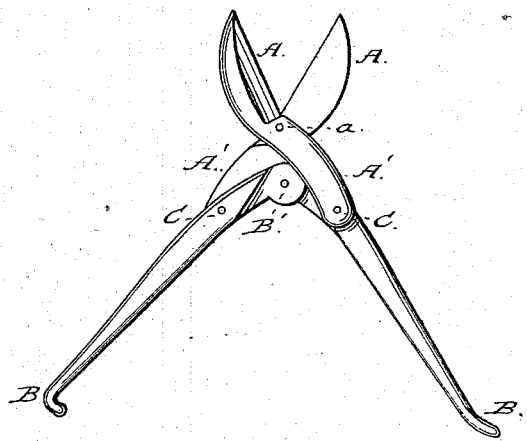
Figure 6:
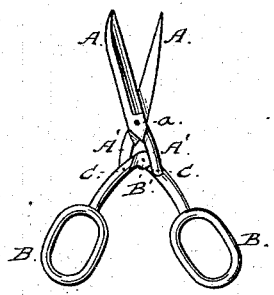

In the accompanying drawings, Figure 1 represents an elevation of a pair of tailors' shears embodying my invention. Fig. 2 represents a detail view of one of the blades thereof. Fig. 3 represents a detail view of the two handles thereof. Fig. 4 represents an elevation of a pair of tinners' hand-shears embodying my invention. Fig. 5 represents an elevation of a pair of tinners' bench-shears embodying my invention; and Fig. 6 represents an elevation of a pair of scissors embodying my invention.

In all of said figures like letters designate like parts.

A designates the cutting-blades, which are crossed and pivoted together at a point just beyond their cutting-edges on a pintle, $a$. The ends of this pintle or pivot-screw may be encircled by disks $a'$, which brace both the blades and the pintle. The diverging rear ends, $A'$, of these blades are thinned from the inside, leaving on their inner faces recesses $A^2$.

B designates the handles, which are pivoted together at their inner ends, $B'$. These inner ends are formed into disks and thinned, so that they will fit side by side between the rear ends, $A'$, of the blades, their position being a little behind or below the pintle $a$ when the shears or scissors are closed. The sides of the shanks of the handles are recessed at $b'\ b^2$, and these recesses, with the recesses $A^2$ on the inner sides of the ends $A'$, allow the blades and handles to fit together when the shears are closed, so as to be flush on all sides. The upper ends of the recesses $A^2$ are rounded, so as to allow free motion of the disk-shaped handle ends therein. The tips of the ends $A'$ are rounded, and the corresponding ends of the recesses $b'$ are rounded for the same purpose. These rounded tips are pivoted to said handles by means of pivot-screws C. When thus constructed and fastened together, a pair of shears obviously consists of a pair of handles pivoted together at their inner ends, and a pair of blades, which are crossed and pivoted together above the point of pivoting the handles together, the rear end of each blade being pivoted to the middle part of the handle, which is on the opposite side of the shears from the operative part of said blade. This construction gives to the shears or scissors a compound leverage, thereby multiplying the power of the implement. The handles and their shanks constitute a pair of levers of the second kind, having their fulcrum in common at the point where they are pivoted together, and applying their power from their middle parts to the rear ends, $A'$, of the blades through the medium of pivot-screws C, which connect said parts together. The blades themselves operate like those of an ordinary pair of shears or scissors, but with the advantage of the additional leverage above described. Of course, the various parts may be considerably modified in form and means of attachment without departing from the spirit or scope of the invention. These articles are cheaply manufactured, as the blades and handles need not be of homogeneous material. The former may be drop-forged from steel. The handles may be of malleable iron. Of course, the shape of the blades may be changed, so as to adapt them to crushing or gripping or biting transversely—that is to say, instead of scissor-blades, they may become the transverse blades of cutting-pliers, or the jaws of nut-crackers, pinchers, tongs, or analogous articles.

As the shape and construction of these implements are well known, and as such changes in the blades involve no changes in those parts (already fully described and illustrated) where the invention lies, it is not deemed necessary to show them separately in the drawings.

Having thus fully described my invention, what I claim as new, and desire to secure by Letters Patent, is—

A pair of handles pivoted together at their inner ends, in combination with a pair of crossed blades or jaws, which are pivoted together, and have their rear ends pivotally connected to the middle parts of said handles, said handles being recessed, so that said blades may set flush in them, substantially as set forth.

In testimony whereof I affix my signature in presence of two witnesses.

SALMON R. PLUMB.

Witnesses:
EDWARD A. CORNWALL,
EUNICE B. CORNWALL.